Patented May 11, 1937

2,080,378

UNITED STATES PATENT OFFICE 2,080,378

COMBINED WEED KILLER AND FERTILIZER

William Quinn, Ottawa, Ill.

No Drawing. Application April 29, 1935, Serial No. 18,876

2 Claims. (Cl. 71—4)

This invention relates to chemical weed killers.

The main object of my invention is to provide a chemical mixture which kills weeds; and further, to provide such a mixture which, through chemical action, also acts as a fertilizer in the soil; to provide a weed killer mixture which may be prepared in powder form; and is readily soluble; to provide a mixture in which heat of solution of one part is positive and the heat of the solution of another part is negative in suitably balanced relations; to provide a physical mixture for this purpose in which substantially no chemical action takes place until it combines with plant life or the soil; to provide a weed-killing mixture which is free from all fire hazards; and to provide a mixture which can be applied to vegetation by any of the well-known methods, and in which the killing effect is almost immediately visible.

My improved weed killer comprises two chemicals which do not combine chemically with each other and which can be mixed in granular form, ready to be applied directly or made up in solutions of any desired strength, depending upon the variety of plant life to which they are to be applied.

Very strong solutions are required for woody fibre plants, such as poison ivy and the like; normal solutions for thistles and weaker solutions for quack grass.

My weed-killing and soil fertilizing mixture comprises sodium hydroxide (NaHO) nine parts and sodium nitrate ($NaNO_3$) one part, in which mixture the caustic soda is the weed-killing agent and the sodium nitrate acts as a fertilizer of the soil about the killed plant.

The mixture is prepared in granular form which can then be dissolved in water to form a solution. Experience has proved that two pounds of the granular mixture added to one gallon of water produces a solution of normal weed killing strength strong enough to kill asteraceous plants, quack grass and the like, and that double this strength is effective on woody structures.

Difficulties encountered in making water solutions of sodium hydroxide, due to the heat produced, are substantially eliminated by the presence of sodium nitrate, the latter having a negative heat of solution.

Application of the mixed granular powder may be made to woody plants but for general use the mixture is placed in solution and applied by means of the usual pump or gravity spray equipment.

In using the equipment a nozzle is selected which will deliver the jet best adapted to the kind of plant for which the solution is intended. When the proper solution is sprinkled or sprayed on vegetation, the burning effect of the caustic soda is immediately evident and experience has proved that the killing effects extend to the creeping roots of quack grass, Canadian thistles and the like; and that the nitrate of soda content combines with the soil so that the area surrounding the killed plant is enriched.

In order to obtain best results with my formula, 96% caustic soda and commercial soda nitrate are used.

I claim:

1. A weed-killing and soil fertilizing solution for eradicating thistles comprising sodium hydroxide nine parts, sodium nitrate one part and water forty-two parts.

2. A weed-killing and soil fertilizing solution for eradicating poison ivy comprising sodium hydroxide nine parts, sodium nitrate one part and water twenty-one parts.

WILLIAM QUINN.